United States Patent

Zott et al.

[15] 3,651,264

[45] Mar. 21, 1972

[54] APPARATUS FOR CALL SIGNALLING IN TELETYPEWRITER SUBSCRIBER STATIONS

[72] Inventors: Ronald Zott; Klaus Schleifer, both of Munich, Germany

[73] Assignee: Siemens Aktiengesellschaft, Berlin and Munich, Germany

[22] Filed: June 27, 1969

[21] Appl. No.: 870,183

[30] Foreign Application Priority Data

June 28, 1968 Germany ......................P 17 62 504.6

[52] U.S. Cl. ............................................................178/69.6

[51] Int. Cl. ............................................................H04l 11/00

[58] Field of Search ..........................................178/69.6, 4.1

[56] References Cited

UNITED STATES PATENTS

| | | | |
|---|---|---|---|
| 2,093,004 | 9/1937 | Burcky | 178/69.6 |
| 2,344,142 | 3/1944 | Hamlett | 178/69.6 |
| 2,370,445 | 2/1945 | Brown | 178/69.6 |
| 2,387,246 | 10/1945 | Demonet et al. | 178/69.6 |
| 2,820,089 | 1/1958 | Schouten et al. | 178/69.6 |

*Primary Examiner*—Kathleen H. Claffy
*Assistant Examiner*—Douglas W. Olms
*Attorney*—Birch, Swindler, McKie & Beckett

[57] ABSTRACT

A circuit arrangement for call signalling in teletypewriter subscriber stations, each having long distance switching apparatus with switching devices and associated contacts to establish connections between teletypewriter subscriber stations, and a voltage supply source.

At least one of optical and acoustical call signalling indicator devices having associated switching means controllable over said associated contacts are located at each teletypewriter subscriber station. The voltage supply of the long distance switching apparatus is connectable to operate the indicator devices.

12 Claims, 1 Drawing Figure

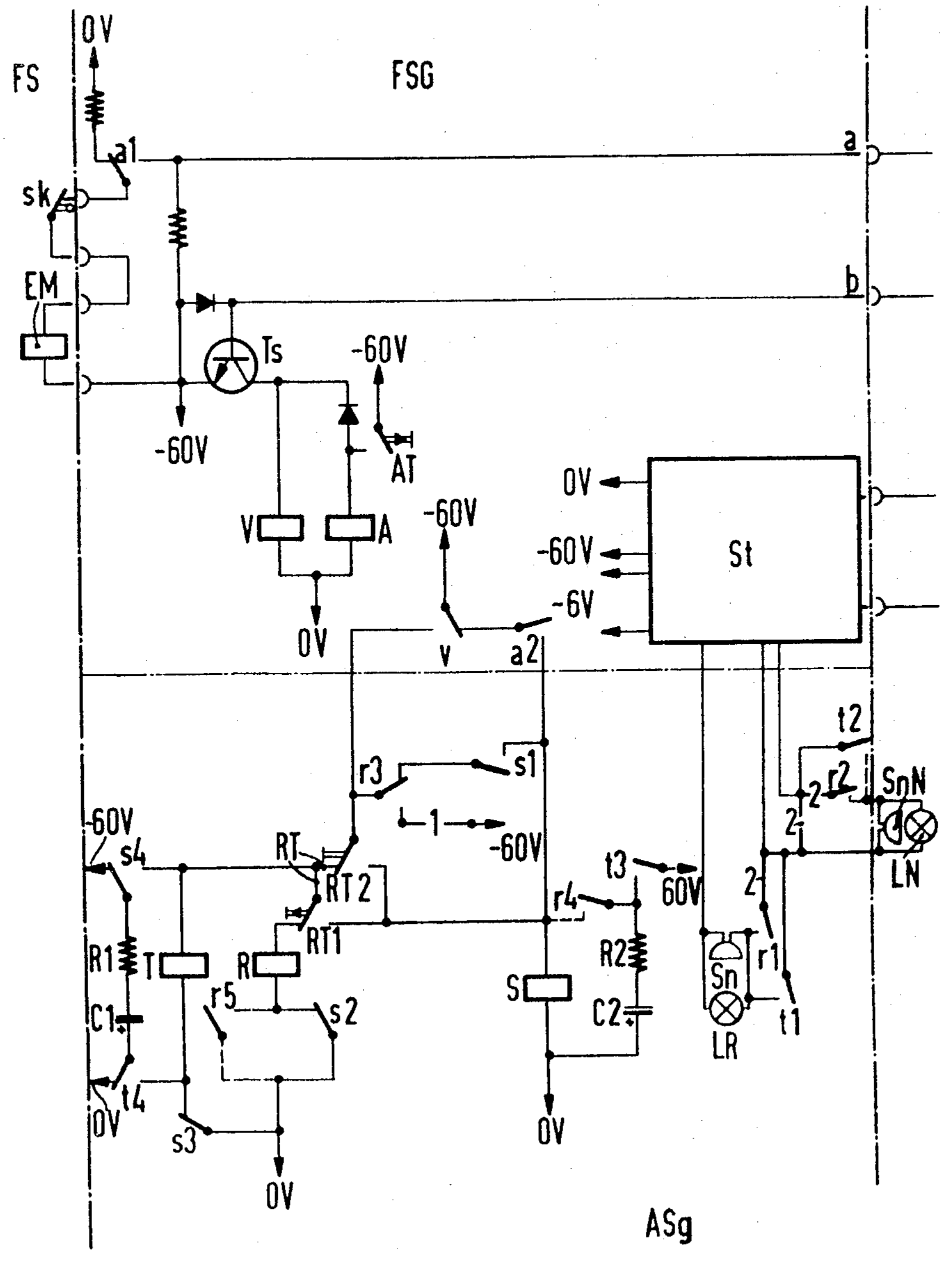
0V
FS
FSG
a1
a
sk
b
EM
Ts
-60V
-60V
AT
0V
V
A
-60V
St
-60V
-6V
0V
v
a2
t2
r3
s1
r2
SnN
-60V
1
-60V
RT
s4
RT2
t3
60V
LN
r4
R1
T
R
RT1
R2
r1
Sn
C1
r5
s2
S
C2
LR
t1
t4
0V
s3
0V
0V
ASg

APPARATUS FOR CALL SIGNALLING IN TELETYPEWRITER SUBSCRIBER STATIONS

REFERENCE TO PRIORITY APPLICATION

Applicants claim priority from German Pat. application No. P 17 62 504.6, filed June 28, 1968.

BACKGROUND OF THE INVENTION

1. Field of the Invention

The invention relates to a teletypewriter subscriber station having means to provide an optical and/or acoustical indication of the signalling of a call.

2. Description of the Prior Art

It is known in the teletypewriter art to assign special call signalling apparatus to a teletypewriter subscriber station for the signalling of a call. Through a special signal, having an acoustical and/or optical effect, an operator can thereby be called to a free teletypewriter subscriber station. Heretofore such call signalling apparatus has been connected as separate supplemental apparatus to the individual teletypewriter subscriber stations. They were looped over the network distributing system plugs of the existing teletypewriter apparatus into the circuit of the network distributing system. This has the disadvantage that the call signalling apparatus responds not only in the case of an incoming, but also in the case of an outgoing call.

SUMMARY OF THE INVENTION

The invention provides an arrangement for call signalling where supplemental apparatuses are not necessary, and which is sufficient for all operational cases occurring at a teletypewriter subscriber station without the need for any special demands to an operator.

This is achieved according to the invention in that the switching devices serving for the connection of optical and/or acoustical indicator devices, preferably relays, are controllable over contacts of switching devices already existing in the long distance switching apparatus for the controlling of connections, and that the current supply to the indicator devices is from the current supply to the long distance switching apparatus.

It is thereby achieved that the call signalling circuit can be combined, technically and constructively, with the long distance switching apparatus. However it is also possible to place a relay circuit connecting the indicator switching devices, for example, on a plug-in printed circuit plate and to insert this in the remote switching apparatus only when required. In both instances the advantages result that a plurality of signalling operations can be realized with a minimum requirement of additional components and that the individual apparatus necessary for a subscriber station can be reduced to a minimum.

BRIEF DESCRIPTION OF THE DRAWING

The drawing shows a switching arrangement according to the invention.

DETAILED DESCRIPTION OF THE INVENTION

A teletypewriter subscriber station is shown in the figure which contains teletypewriter FS, remote switching apparatus FSG and call signalling circuit AS*g*. The teletypewriter is symbolized only by the transmission contact *sk* and the receiving magnet EM. Remote switching apparatus FSG essentially contains a transistor T*s* that evaluates a change in polarity on teletypewriter lines *a* and *b*, by changing from a nonconducting to a conducting state or vice versa, depending on the polarities involved. In the collector circuit of transistor T*s*, relays V and A are arranged. The remote switching unit contains contacts *v* and *a*2 associated respectively with relays V and A. In the lower part of the drawing, call signalling circuit AS*g* is shown with indicator devices LR and S*n*. The former is, for example, a lamp and the latter a ringing mechanism emitting an acoustical signal. Relays R and S control the indicator switching devices LR and S*n*, respectively. As will be described later in more detail, an interval signal can be generated over a third relay T. Relays R, T and S are controllable over contacts of relays V and A, already existing in the remote switching apparatus, that is, over contacts *v* and *a*2. In addition, the call signalling circuit AS*g* contains key RT, having first and second ascertainable contact positions RT1 and RT2. The key may comprise for example, a so-called luminous pressure rotating key, with first contact position RT1 being obtained by pressure, and second contact position RT2 by turning of the key. The second contact position at the same time corresponds to rest position.

It shall be assumed for the purpose of explaining the operation that by reason of a call intended for teletypewriter subscriber station FST, the subscriber line is changed in polarity from the direction of the exchange office, over lines *a* and *b*, and thereby transistor T*s* is controlled to conduction. Through this, relays V and A, arranged in remote switching apparatus FSG, are energized. In known manner, teletypewriter FS is connected over contact *a*1 to the subscriber line leading to the exchange office. Contacts *v* and *a*2 are also actuated. Over contact RT1 and RT2, closed in rest position (position as drawn in), of key RT, there then exists an exciter circuit for relay R: OV, *s*2, R, RT1, RT2, *v*, −60V.

Over contact *r*1 and connection 2, lamp LR and ringing mechanism S*n* are connected to voltage supply S*t* of the long distance switching apparatus. Thus the call is signalled optically (over LR), as well as acoustically (over S*n*). It is, of course, possible within the framework of the invention to also control, with the aid of further contacts, for example, *r*2, indicator devices arranged outside of the long distance switching apparatus. For this purpose lamp LN and ringing system S*n*N are shown in the drawing. The current supply to these external indicator switching devices can take place either over the current supply of the long distance switching apparatus, as shown in the drawing, or over other outside current sources.

The call signalling criterion can be cancelled by pressing key RT into contact position RT1 thereby interrupting the exciter circuit for relay R. In order to prevent, after release of key RT, the relay from responding and thereby again switching-on the call signal, actuated contact RT1 closes a circuit for relay S: OV, S, RT1, RT2, *v*, −60V. Over contact *s*1 of relay S this relay continues to maintain itself until completion of the connection (dropping out of relay V in long distance switching apparatus FSG): OV, S, S1, *r*3, *v*, −60V.

Over contact *s*2, the response circuit for relay R is opened. However, relay R also drops out, if after the completion of the connection (dropping out of relay V in long distance switching apparatus FSG), contact *v* returns into the drawn-in position. In case that even after completion of the connection a signalling criterion is to be present at the subscriber station, connection 1 can be provided over which a holding circuit can be established for relay R. After the connection 1 is inserted, the following circuit results: OV, *s*2, R, RT1, RT2, *r*3, 1, −60V.

If the signalling of arriving calls is not desired, key RT is put into its second contact position. This is done, as has already been indicated, by turning the key to the rest position. In the drawing this contact position has been designated RT2. Now if a call arrives, that is, if contact *v* is recontrolled, relay S again responds over the circuit: OV, S, RT2, *v*, −60V. Over contact *s*2 the response circuit for relay R is opened. Over actuated contact *s*1 and contact *r*3, which is in the drawn-in rest position, a holding circuit is formed for relay S for the duration of a connection. Upon turning back of the key during an existing connection the circuit for relay S is maintained over contacts *s*1 and *r*3 until the connection is completed.

It is often requested by a subscriber that a signalling criterion be indicated not by a permanent signal, but by an interval signal. To obtain this interval signal, an additional switching assembly may be provided. It contains relay T with contacts $t1$ to $t4$, as well as time-delaying switching devices R1, C1 and R2, C2 and is controlled by contacts $s3$, $s4$ and $r4$, $r5$ of the already described relays S and R. This part of the call signalling circuit can either be solidly wired to the heretofore mentioned components, or, however, can be arranged so that it can be plugged in.

The interval signal is obtained through time-delaying switching devices R1, C1, or R2, C2 which are connectable in parallel to relays T and S respectively. Thereby the mode of operation of the broadened call signalling circuit for the generation of an interval signal is as follows: An arriving call which is detected through responding of relays V and A in a known manner leads, over the actuated contact $v$ to the responding of the relays R and T. However, over the actuated contacts thereof ($t3$ and $t4$) relay S is also energized. Over contact $s3$, the response circuit for relay T is opened again, but at the same time the time delaying switching devices R1, C1 are switched in parallel over contacts $s4$ and $t4$. After a dropout period, determined by the values of the R1, C1 circuit, relay T drops out, the opens through its contact $t3$ the exciter circuit for relay S, the dropout period whereof in turn is determined by the R2, C2-circuit connected in parallel. With the dropping-out of relay S, the response circuit for relay T is again completed and the described process repeated. Over first and second contacts $t1$ and $t2$ of relay T, also shown by dashed lines in the drawing, the optical or acoustical indicator switching devices S$n$, L$r$, or S$n$N, LN are excited in the interval. In order to prevent permanent excitement of the indicator switching devices over contacts $r1$ and $r2$ during this case of signalling, it is only necessary to remove the connections designated by 2 in the drawing.

In the instance of permanent signalling, relay S prevents in case of outgoing calls and after the cancellation of a call signal, the responding of relay R, in that over contact $s2$ the exciter circuit for relay R is opened. It has the additional task in case of interval signalling to indirectly control the connection of the indicator switching devices, in that the response circuit for relay T is opened over contact $s3$, and the time-delaying switching device is connected over contact $s4$.

After completion of a connection, that is, after recontrolling of contact $v$, relay R drops out and immediately opens with its contact $r4$ the delay circuit of relay S, so that the signalling is terminated immediately after completion of the connection, independent from the position of the interval generators. At the same time it is achieved thereby that a new call, arriving immediately after the release of the connection, can again be signalled in the described manner.

It is also possible within the framework of the invention to achieve the time-delayed dropping out of relay T by substituting for it a winding of a so-called thermorelay. The R1, C1 circuit is then no longer needed as the time delay in this case is determined by the heating and cooling time of the thermorelay itself. It is further possible to achieve the time-delayed dropping-out of the relays T and S with the aid of circuits consisting of a transistor and a capacitor of small capacitance.

In case of a departing call which is initiated in known manner by pressing of call key AT, at first only relay A responds in long distance switching apparatus FSG. Over the thereby actuated contact $a2$ relay S is excited over the circuit: OV, S, $a2$, $v$, −60V. Over contacts $s2$ and s3 the response circuits for relays R and T are opened, so that in this case even after recontrolling of contact $v$, upon arrival of a "connected" signal over subscriber line $a$, $b$, any signalling is prevented.

The principle of call signalling which has been explained in the described example with the aid of a subscriber station operated with two-wire single current, is independent from the method of operation of the subscriber station.

We claim:

1. A circuit arrangement for call signalling in teletypewriter subscriber stations, each having remote switching apparatus (FSG) with switching devices (A, V) and associated contacts ($a2$, $v$) for establishing connections between teletypewriter subscriber stations, and a voltage supply (S$t$) comprising:
   at least one of optical (LR) and acoustical (S$n$) call signalling indicator devices having associated switching means (R, T) controllable over said associated contacts located at each teletypewriter subscriber station, and
   the voltage supply (S$t$) of the remote switching apparatus being connectable to operate the indicator devices.

2. The circuit arrangement as recited in claim 1, wherein the switching devices comprise a first relay (V) energizeable in response to incoming seizure to actuate a first associated contact ($v$) and a second relay (A) responsive to outgoing seizure to actuate a second associated contact ($a2$),
   a third relay (R) responsive to actuation of the first contact ($v$) having an associated third contact ($r1$) to connect the current supply source to the teletypewriter subscriber station, and an associated fourth contact ($r2$) to connect an energy source to other spatially separated indicator devices (LN, S$n$N),
   a fourth relay (S) responsive to actuation of the second contact ($a2$) having an associated fifth contact ($s2$) to deenergize the third relay (R).

3. A circuit arrangement as recited in claim 2, wherein the energy source is separate from the voltage supply source (S$t$).

4. A circuit arrangement as recited in claim 2, further comprising:
   a key (RT) having an associated sixth contact (RT1) positioned in response circuit of the third relay (R) actuable to deenergize the third relay (R) and energize the fourth relay (S), the latter having a holding circuit.

5. A circuit arrangement as recited in claim 2, further comprising:
   means (1) to energize the third relay (R) independently from the state of seizure of the teletypewriter subscriber station to maintain the call signal beyond the duration of the connection.

6. A circuit arrangement as recited in claim 4, wherein the key (RT) further comprises a seventh contact (RT2) actuable from the rest position to establish a holding circuit for the fourth relay (S) during an existing connection.

7. A circuit arrangement as recited in claim 4, further comprising:
   a fifth relay (T) energizeable in response to seizure of the associated teletypewriter subscriber station to cause generation of an interval signal having an associated contact ($t3$) actuable to energize the fourth relay (S), the latter having an associated contact ($s3$) actuable to deenergize the fifth relay (T), and
   time delay circuit means operable to determine the dropout times of the fourth (S) and fifth (T) relays.

8. A circuit arrangement as recited in claim 7, wherein the fifth relay (T) comprises other associated contacts to control operation of the indicator devices.

9. A circuit arrangement as recited in claim 8, wherein a time delay circuit (R2, C2) is assigned to a fourth relay (S) having a contact ($r4$) associated with the third relay (R) disposed therein.

10. A circuit arrangement as recited in claim 7, wherein the fifth relay (T) comprises a thermal relay.

11. A circuit arrangement as recited in claim 1, wherein the call signalling circuit (AS$g$) is a fixed component of the remote switching apparatus (FSG).

12. A circuit arrangement as recited in claim 1, wherein the call signalling circuit (AS$g$) forms a component group which is constructed to be plugged into the remote switching apparatus (FSG).

* * * * *